(12) United States Patent
Ellegaard et al.

(10) Patent No.: US 10,085,386 B2
(45) Date of Patent: Oct. 2, 2018

(54) METHOD OF MANUFACTURING A PLANT RECEPTACLE AS WELL AS A PLANT RECEPTACLE

(71) Applicant: ELLEGAARD HOLDING A/S, Esbjerg O (DK)

(72) Inventors: Merethe Ellegaard, Esbjerg O (DK); Carsten Storgaard, Kolding (DK)

(73) Assignee: ELLEGAARD HOLDINGS A/S, Esbjerg O (DK)

( * ) Notice: Subject to any disclaimer, the term of this patent is extended or adjusted under 35 U.S.C. 154(b) by 140 days.

(21) Appl. No.: 15/034,254

(22) PCT Filed: Nov. 5, 2014

(86) PCT No.: PCT/DK2014/050362
§ 371 (c)(1),
(2) Date: May 4, 2016

(87) PCT Pub. No.: WO2015/067272
PCT Pub. Date: May 14, 2015

(65) Prior Publication Data
US 2016/0262314 A1    Sep. 15, 2016

(30) Foreign Application Priority Data
Nov. 5, 2013 (DK) .................................. 2013 70643

(51) Int. Cl.
| | | |
|---|---|---|
| *A01G 9/10* | (2006.01) | |
| *A01G 9/02* | (2018.01) | |
| *A01G 9/029* | (2018.01) | |
| *D04H 3/011* | (2012.01) | |

(52) U.S. Cl.
CPC ........... *A01G 9/021* (2013.01); *A01G 9/0295* (2018.02); *D04H 3/011* (2013.01); *D10B 2401/12* (2013.01)

(58) Field of Classification Search
CPC .............................. A01G 9/021; A01G 9/0295
USPC .............................................. 47/65.7, 74, 56
See application file for complete search history.

(56) References Cited

U.S. PATENT DOCUMENTS

| | | | | |
|---|---|---|---|---|
| 3,172,234 A | * | 3/1965 | Eavis ..................... | A01G 9/104 47/56 |
| 4,215,513 A | * | 8/1980 | Dedolph ................ | A01C 11/02 47/56 |
| 4,369,599 A | * | 1/1983 | Franclet ................ | A01G 9/0295 47/74 |
| 4,910,911 A | * | 3/1990 | Ahm ..................... | A01G 9/1006 47/56 |
| 5,966,866 A | * | 10/1999 | Ferguson ................ | A01G 5/06 206/423 |
| 6,195,938 B1 | | 3/2001 | Chee | |
| 6,240,674 B1 | * | 6/2001 | Otake .................... | A01C 1/042 47/56 |
| 6,460,473 B1 | * | 10/2002 | Onodera ............... | A01C 1/042 111/199 |
| 2006/0162248 A1 | * | 7/2006 | Ahm ...................... | A01C 1/042 47/56 |
| 2009/0025290 A1 | * | 1/2009 | Trabka .................. | A01G 9/026 47/66.7 |

FOREIGN PATENT DOCUMENTS

| | | |
|---|---|---|
| EP | 1099368 A2 | 5/2001 |
| EP | 1 129 612 A2 | 9/2001 |
| EP | 1 541 345 A1 | 6/2005 |
| JP | 2000 342077 A | 12/2000 |
| WO | WO 2004028237 | 9/2002 |
| WO | WO 2009142714 A2 | 11/2009 |
| WO | WO 2013174386 A1 | 11/2013 |

OTHER PUBLICATIONS

International Preliminary Report on Patentability for International (PCT) Patent Application No. PCT/DK2014/050362, dated May 10, 2015, 6 pages.
International Search Report and Written Opinion prepared by the European Patent Office dated Feb. 10, 2015, for International Application No. PCT/DK2014/050362.

\* cited by examiner

*Primary Examiner* — Peter M Poon
*Assistant Examiner* — Danielle A Clerkley
(74) *Attorney, Agent, or Firm* — Berg Hill Greenleaf Ruscitti LLP.

(57) ABSTRACT

Method of manufacturing a plant receptacle wherein the following steps are performed: •a) providing a mixture of fibers, said mixture at least comprising PLA fibers and a bio-degradable fiber; •b) using said mixture of fibers in a woven or non-woven process, making a permeable sheet material; •c) continuously forming said sheet material into a continuous receptacle, by bringing the side edges of said sheet material into contact and welding said side edges together; •d) cutting said continuous receptacle in predetermined lengths thereby creating separate plant receptacles or wherein said continuous receptacle is perforated substantially perpendicular to the longitudinal direction of the continuous receptacle at predetermined intervals, thereby allowing separate plant receptacles to be detached from the continuous receptacle.

6 Claims, No Drawings

METHOD OF MANUFACTURING A PLANT RECEPTACLE AS WELL AS A PLANT RECEPTACLE

CROSS REFERENCE TO RELATED APPLICATIONS

This application is a national stage application under 35 U.S.C. 371 and claims the benefit of PCT Application No. PCT/DK2013/050034 having an international filing date of Feb. 8, 2013, which designated the United States, which PCT application claimed the benefit of Danish Patent Application No. PA 2012 70068 filed Feb. 10, 2012, the disclosure of both the above-identified applications are incorporated herein by reference.

FIELD OF THE INVENTION

The present invention relates to a method of manufacturing a plant receptacle comprising a number of steps as well as a plant receptacle manufactured by said process.

BACKGROUND OF THE INVENTION

For the propagation of plants either starting from seeds or from cuttings it is well-known in the art to use small pots, for example pots made from plastic or polymer netting or sphagnum where growth media as well as the seed or cutting are placed inside the growth media in the pot.

These pots are traditionally made in a very large number where the pots have to fulfil certain requirements relating to its ability to drain off excess water, to allow air, especially oxygen, into the growth media and thereby stimulate the propagation of roots and thereby growth of the entire plant. The pots have to be cheap, relatively easy to handle and at the same time preferably biodegradable. At the same time it is desirable that the pot has further abilities—for example being able to maintain the growth media in a stable and secure manner, even during handling and overall stimulating the propagation of the plants starting from the seeds or cuttings.

Various prior art attempts to address these issues have been published, as for example EP 1 099 368 and WO2009/142714, which however do not facilitate cheap manufacture in combination which fast biodegradability/de-composition.

The same applicant's prior published application WO2013174386 likewise addresses these issues, and obtains very good results both with respect to biodegradability, permeability and stability, but includes a rather complicated production process in which the material from which the plant receptacles are formed is made from a co-extruded PLA thread which during the extrusion process is covered by an organic containing flexible aliphatic polyester. In addition to being relatively complicated to manufacture, the material is also not cheap.

In the terminology of the present invention cutting shall be understood as pieces of plant tissue which is cut off other plants and placed in the growth media in order to grow to be new plants.

OBJECT OF THE INVENTION

The present invention is directed to a novel and inventive method of manufacturing such a type of plant receptacle where the receptacle comprises further advantageous features as compared to the prior art.

DESCRIPTION OF THE INVENTION

The present invention consequently presents a method of manufacturing a plant receptacle wherein the following steps are performed:
  a) providing a mixture of fibres, said mixture at least comprising PLA fibres and a bio-degradable fibre;
  b) using said mixture of fibres in a woven or non-woven process, making a permeable sheet material;
  c) continuously forming said sheet material into a continuous receptacle, by bringing the side edges of said sheet material into contact and welding said side edges together;
  d) cutting said continuous receptacle in predetermined lengths thereby creating separate plant receptacles or wherein said continuous receptacle is perforated substantially perpendicular to the longitudinal direction of the continuous receptacle at predetermined intervals, thereby allowing separate plant receptacles to be detached from the continuous receptacle.

The inventive method combines a mono PLA, i.e. a PLA without any support materials in a welding process, which hitherto has been considered very difficult, close to impossible. But by providing a support in the shape of a biodegradable fibre, a number of objects are achieved. A relatively stable and strong sheet material is obtained which allows air and moisture to travel through the material, making it possible to create optimum conditions for plant propagation. At the same time the receptacle is biodegradable. Experiments have shown that it is further possible to control the degree of decomposition/degeneration/biodegradability by controlling the mix of fibres, i.e. the less PLA the faster decomposition.

Normally dry-laid materials are prone to shrink, but the biodegradable fibres in combination with the PLA provide a very stable material unlikely to cause any shrinkage which may be considered detrimental.

Normally PLA is not weldable, as it will melt away without adhering to its surroundings, but by providing the biodegradable fibres as support a weld will form.

In order for the web to be able to withstand the handling, treatment etc. it is necessary to provide a certain strength in the web. For these purposes the web shall be able to withstand tension in the longitudinal direction of the web of from 35-55 N with a maximum elongation of 2-10% (which for typical receptacles correspond to between 2 mm and 15 mm). Transversely the web shall withstand a tension of 10-30 N, with an elongation between 2 and 15% (corresponding to a typical elongation of a receptacle between 5 and 15 mm). All values listed as until/before breakage.

PLA is not weldable on itself to a degree satisfying the strength requirements, but by adding the biodegradable fibres, even in a small amount, the PLA is able to provide the necessary strength as required.

The present method may employ a wide variety of methods such as spunbond molding, non-woven fibre moulding, spinning, elongation, opening, capturing etc. for the manufacture of the material sheet. The methods are mentioned without any limitation being intended.

Also according to the invention, in one or more embodiments: (a) the permeable sheet material is non-woven and obtained through an air-laid, wet-laid, dry-laid or a carding method; (b) the content of PLA fibres is between 20% to 95% by weight (c) the bio degradable fibre is selected from one or more of the following materials: cellulose, viscose, cotton, bamboo, soya, palm, coconut, flax, and/or banana; and (d) the fiber length in the mixture of fibers is between 0.5 mm and 60 mm, more preferred between 1 mm and 25 mm.

Spunbond is called filament fiber non-woven fabric since it uses filaments. The filament spun out of the extruder is elongated and stacked on the conveyor. The stacked web is then bonded to the calendar roll and wound after undergoing the transfer process.

The spunbond molding device performs web forming processes such as spinning, elongation opening and capturing process.

The spinning process involves discharging molten polymer as a filament into the air through the nozzle.

Both melt and wet spinning are used in the process, but the former is most common.

In the elongation process, the tensile strength of the discharged filament increases as it is elongated through the high-speed air roll or other rolls having different revolution speeds.

The opening process involves uniformly separating the elongated filament, which greatly affects the performance of non-woven fabric. The filament opening process includes electrostatic charge, impingement plate, and air current diffusion methods. The electrostatic charge method involves building up the same static charge in each filament to induce an opening using its repulsive force.

The impingement plate method involves having the filament hit the impingement plate to be dispersed. The air current diffusion method entails installing an air current diffusion device at the vent of high-speed air fluid to diffuse air current aerodynamically, thereby putting the filament on a diffused air current to induce opening.

In the capturing process, the opened filament site on an air-permeable screen conveyor or a screen drum.

The web formed on the screen is sucked in from the screen surface to prevent it from being blown away by the high-speed air current.

Extensive testing has shown that the addition of an organic material such as for example bamboo material to the sheet material from which the plant receptacle is manufactured provides a number of advantages. Firstly, the bamboo content acts as a fungicide, i.e. it will hinder the growth of fungus on the plant receptacle as such, but also in the growth media placed inside the plant receptacle. This is a very important aspect as fungus is a very aggressive organism which will deplete the growth media of important nutrients, moisture and oxygen which would otherwise stimulate the growth of the plant placed inside the plant receptacle.

Furthermore, by using a PLA or polylactide based polyester manufactured from a lactic acid, the base material is biologically degradable in an industrialized composting process (mulching plant). The flexible aliphatic polyester comprising 10 wt % to 30 wt % organic material is a modified aliphatic polyester, which in addition to being biodegradable also has further advantageous characteristics, which will be elaborated below. A preferred flexible aliphatic polyester is available under the trade name GS Pla®, which is a registered trademark and covers a whole group of materials, where the GS Pla stands for Green Sustainable Plastics, the GS Pla obtainable from e.g. the Mitsubishi Chemical Corporation is composed mainly of succinic acid and 1,4-butanediol thereby making the GS Pla, a flexible aliphatic polyester with properties similar to those of polyolefin.

Traditionally, plant receptacles or pots used for this purpose in the prior art are coated or treated with a fungicide in order to avoid the propagation of fungus, but the fungicide treatment is prohibited in a number of jurisdictions, and furthermore the use of fungicides is an extra pollutant and thereby a hazard to the environment. Also, treatment with a fungicide is an extra cost in the manufacture of a low cost product and therefore also influential on the competitive edge of the product as such. It is therefore advantageous to be able to add a built-in natural fungicide which has no hazardous side effects and which is not listed as a fungicide and therefore is not ruled illegal in a number of jurisdictions and at the same time is a relatively cheap addition to the material from which the plant receptacle is made.

Therefore, the combination of characteristics of the materials creates the best of both worlds, i.e. a non-hazardous, non-polluting, biodegradable sheet material which according to tests carried out has a substantially higher (20-40%) permeability for air and moisture compared to other similar products, which stimulates plant growth and at the same time a very simple, fast and inexpensive process, namely heat sealing or welding, may be used in order to manufacture the plant receptacles. The organic, especially bamboo content ensures a fungicidal effect such that the excellent properties of the material may be maintained over time until it is desirable to compost the plant receptacle.

The invention claimed is:

1. A method of manufacturing a plant receptacle wherein the following steps are performed:
   a) providing a mixture of fibers, said mixture at least comprising PLA fibers without any support material and a bio-degradable fiber;
   b) using said mixture of fibers in a woven or non-woven process, making a permeable sheet material being a combination of the PLA fibers and the bio-degradable fibers;
   c) wherein the content of PLA fibers is between 20% to 95% by weight;
   d) continuously forming said sheet material into a continuous receptacle, by bringing side edges of said sheet material into contact and welding said side edges together;
   e) cutting said continuous receptacle in predetermined lengths thereby creating separate plant receptacles or wherein said continuous receptacle is perforated substantially perpendicular to the longitudinal direction of the continuous receptacle at predetermined intervals, thereby allowing separate plant receptacles to be detached from the continuous receptacle.

2. The method according to claim 1 wherein the bio-degradable fiber is selected from one or more of the following materials: cellulose, viscose, cotton, bamboo, soya, palm, coconut, flax, and/or banana.

3. The method according to claim 1 wherein the permeable sheet material is non-woven and obtained through an air-laid, wet-laid, dry-laid or carding method.

4. The method according to claim 1 wherein the fiber length in the mixture of fibers is between 0.5 mm and 60 mm.

5. The method according to claim 4 wherein the fiber length in the mixture of fibers is between 1 mm and 25 mm.

6. A plant receptacle manufactured from a material manufactured according to a method according to claim 1.

* * * * *